(12) United States Patent
Zhang et al.

(10) Patent No.: US 8,514,477 B2
(45) Date of Patent: Aug. 20, 2013

(54) OPTICAL ARRANGEMENTS FOR IMAGING INCLUDING AN ACOUSTO-OPTIC TUNABLE FILTER AND AT LEAST ONE PETZVAL LENS COMBINATION

(75) Inventors: Guhong Zhang, Windermere, FL (US); Christopher N. Pannell, Orlando, FL (US)

(73) Assignee: Gooch and Housego PLC, Somerset (GB)

( * ) Notice: Subject to any disclaimer, the term of this patent is extended or adjusted under 35 U.S.C. 154(b) by 0 days.

(21) Appl. No.: 13/309,596

(22) Filed: Dec. 2, 2011

(65) Prior Publication Data

US 2012/0147450 A1 Jun. 14, 2012

Related U.S. Application Data

(60) Provisional application No. 61/420,850, filed on Dec. 8, 2010.

(51) Int. Cl.
 *G02F 1/11* (2006.01)
(52) U.S. Cl.
 USPC .......................................... 359/287
(58) Field of Classification Search
 USPC ................... 359/285–287, 305–314
 See application file for complete search history.

(56) References Cited

U.S. PATENT DOCUMENTS

| | | | |
|---|---|---|---|
| 4,081,207 A | 3/1978 | Dippel | |
| 5,633,747 A * | 5/1997 | Nikoonahad | 359/312 |
| 7,038,863 B2 | 5/2006 | Chen et al. | |
| 7,075,698 B2 * | 7/2006 | Ribak | 359/305 |

OTHER PUBLICATIONS

Dennis R Suhre, et al., "Telecentric Confocal Optics for Aberration Correction of Acousto-Optic Tunable Filters", Applied Optics, vol. 43, No. 6, pp. 1255-1260, Feb. 20, 2004.

* cited by examiner

*Primary Examiner* — Tuyen Tra
(74) *Attorney, Agent, or Firm* — Jetter & Associates, P.A.

(57) ABSTRACT

An optical combination includes an input lens having an optical axis for receiving incoming rays, an output Petzval lens combination including spaced apart doublet lenses $L_3$ and $L_4$ both aligned along the optical axis, and an acousto-optic tunable filter (AOTF) that defines an input side and an output side for the optical combination positioned between the input lens and $L_3$. An input aperture stop is on the input side and an output beam stop is on or near $L_4$. The input lens can be an input Petzval lens combination including spaced apart doublet lenses $L_2$ and $L_1$, wherein the input aperture stop is on or near $L_2$, and the input Petzval lens combination and output Petzval lens combinations are aligned back-to-back.

14 Claims, 5 Drawing Sheets

OPTICAL ARRANGEMENTS FOR IMAGING INCLUDING AN ACOUSTO-OPTIC TUNABLE FILTER AND AT LEAST ONE PETZVAL LENS COMBINATION

CROSS REFERENCE TO RELATED APPLICATIONS

This application claims the benefit of Provisional Application Ser. No. 61/420,850 entitled "OPTICAL ARRANGEMENTS FOR IMAGING INCLUDING AN ACOUSTO-OPTIC TUNABLE FILTER AND AT LEAST ONE PETZVAL LENS COMBINATION" filed Dec. 8, 2010, which is herein incorporated by reference in its entirety.

FIELD

Disclosed embodiments relate to optical arrangements including an acousto-optic tunable filter (AOTF) and aberration correction optics.

BACKGROUND

An AOTF is essentially a solid-state agile random-access tunable filter, where the wavelength is selected by an RF drive signal applied to an electrode attached to an acoustic transducer that is attached to a birefringent interaction medium, such as a tellurium dioxide ($TeO_2$) crystal. It is well known that AOTFs provide one way of realizing a fast hyperspectral imager, since the AOTF can rapidly switch between wavelength bands. However, if the AOTF is placed in the optical train within a collimated beam ("afocal system", i.e., no intermediate image formed in the AOTF) a particular form of aberration peculiar to the AOTF known as "acousto-optic blur" or "acoustic blur" causes the instrument point spread function (PSF) to increase in size in the direction corresponding to the acoustic scattering plane.

Thus, an optical instrument with its AOTF removed and replaced with an equivalent fixed bandpass filter centered at the same wavelength would exhibit a PSF in the form of a blurred circle or disc when used to image a pointlike object which is below the instrument's resolution limit. This is normal behavior for a conventional optical system having rotational symmetry. If the AOTF is replaced in a collimated space between the input conditioning optics and a photodetector such as a focal plane array (FPA), making suitable adjustments for the wanted diffracted beam exiting from the AOTF being deflected by a small angle from the unwanted ("zero-order" undiffracted) beam, then the situation changes. The diameter of the PSF will be substantially unchanged in the direction orthogonal to the scattering plane, but will increase in the direction corresponding to the plane of scattering, thus making the PSF appear elliptical.

The amount of "elongation" depends on the optical bandwidth of the AOTF. This effect is caused because the diffracted (first-order) rays exiting the AOTF have a direction which depends weakly on the actual wavelength. As the AOTF has a finite bandwidth, which may be a few nanometers (typically), rays with wavelengths falling in the range at which transmission occurs will have a small but finite angular spread (e.g., tens of micro-radians). These rays appear to emanate from a region inside the AOTF if traced back. If the system is afocal, then at the detector array (e.g., FPA), objects in focus are will be somewhere in front of the input conditioning lens, and the bundle of rays corresponding to a pointlike distant object will be parallel (i.e., form a collimated bundle of rays or beam). Thus, if another object is placed in the AOTF, it will appear out of focus, thus accounting for the small halo of "blur" which this optical configuration produces.

This blurring effect can be minimized by increasing the length of the acoustic transducer to increase the interaction length, that in turn reduces the filter bandwidth, which minimizes the angular spread of the diffracted rays corresponding to the pointlike object. Instead of a "pointlike object", one can imagine concentrating only on the rays emanating from a small area of a finite sized object, with this area tending to a very small region, and tracing their passage through the AOTF.

The blurring results because the AOTF is trying to "look at" two objects (the distant real one and the local "AOTF-induced" object) at different distances and bring them to focus at the detector array simultaneously. However, this is impossible since one or both of these objects will be out of focus at any particular setting of the optics, so that both objects will never be capable of being focused simultaneously.

One solution to this problem is to form an intermediate image of the "object point" inside the AOTF at the location where the diffracted, filtered rays appear to come from. When this is done, the angular spread due to acoustic blur and the angular spread due to the object relayed into the AOTF are two fans emanating from the same point, and thus cannot be distinguished. This arrangement eliminates the need for the AOTF to focus on two differently spaced objects at the same time.

This solution is well known, and one realization is shown as a schematic diagram in FIG. 1 referred to as a telecentric-confocal AOTF-based imaging system 100. Refraction at the input and exit surfaces of the AOTF is ignored in FIG. 1 for simplicity. The term "telecentric" is known in optics and refers in this case to an aperture stop ($S_1$) positioned at the input and a beam stop ($S_2$) positioned at the output of the system 100 identified as an "exit pupil" at a distance from their respective lenses 101 and 102 equal to the focal lengths $f_1$ and $f_2$ associated with their respective lenses. Stops $S_1$ and $S_2$ are shown at conjugate positions (i.e., so that the image of the aperture stop $S_1$ is formed at the beam stop $S_2$).

The aperture stop $S_1$ ensures that the optical setup is telecentric for the object space, so that the chief ray of each ray pencil is incident on the AOTF 120, that is shown having an acoustic transducer 125 thereon, at normal incidence, or at least at the same angle. The position of the beam stop $S_2$ at the front focal length $f_2$ of lens 102 efficiently blocks the unwanted zero order unfiltered light transmitted by the AOTF 120 to ensure telecentricity in the image space. This is the light that passes straight through the AOTF 120 because it contains wavelengths outside the bandwidth of the AOTF 120. Since the zero-order beam is generally far brighter than the wanted filtered beam, removing it efficiently is important. System 100 also includes a photodetector, such as the camera 160 shown.

System 100 causes a slight, but generally insignificant, variation of the center wavelength of the AOTF 120 with position. Moreover, it can be seen that the total length of system 100 between the aperture stop $S_1$ and beam stop $S_2$ is equal $2f_1+2f_2$.

SUMMARY

Disclosed embodiments describe acousto-optic tunable filter (AOTF)-based optical combinations and imaging systems therefrom that include at least a Petzval lens combination on the output side. Disclosed embodiments are based on the recognition that Petzval lens combinations provide significant advantages for AOTF-based systems based on the ability to position apertures and stops in the right place for the AOTF to work well, and to efficiently block the unwanted (zero order) light in a short distance, allowing optical combinations and imaging systems therefrom to be more compact compared to known optical combinations and telecentric-confocal AOTF-based imaging systems therefrom, such as known imaging system 100 shown in FIG. 1.

In one disclosed embodiment an optical combination comprises an input lens having an optical axis for receiving incoming rays, an output Petzval lens combination including spaced apart doublet lenses $L_3$ and $L_4$ both aligned along the optical axis of the optical combination, and an AOTF that defines an input side and an output side for the optical combination positioned between the input lens and $L_3$ of the output Petzval lens combination. An input aperture stop is provided on the input side and an output beam stop is provided on or near $L_4$ As used herein, an aperture stop or beam stop being "near" a lens means a small distance as compared to the focal length of the adjacent doublet lens, defined herein as a range between 0 (contact) to 20% of the focal length of the associated Petzval lens combination. In a typical embodiment, the stops will be a separate fixture, mounted independently of the doublet lens, and positioned close to the doublet lens, just far enough away to avoid touching and possibly scratching the anti-reflection coating that is generally provided on the doublet lens.

In one embodiment, disclosed Petzval lens combinations are provided for both the input and output sides in a back-to-back configuration. Disclosed embodiments also include imaging systems including multi-spectral and hyperspectral imaging systems that comprise disclosed optical combinations together with a photodetector.

DETAILED DESCRIPTION

Figure 1:
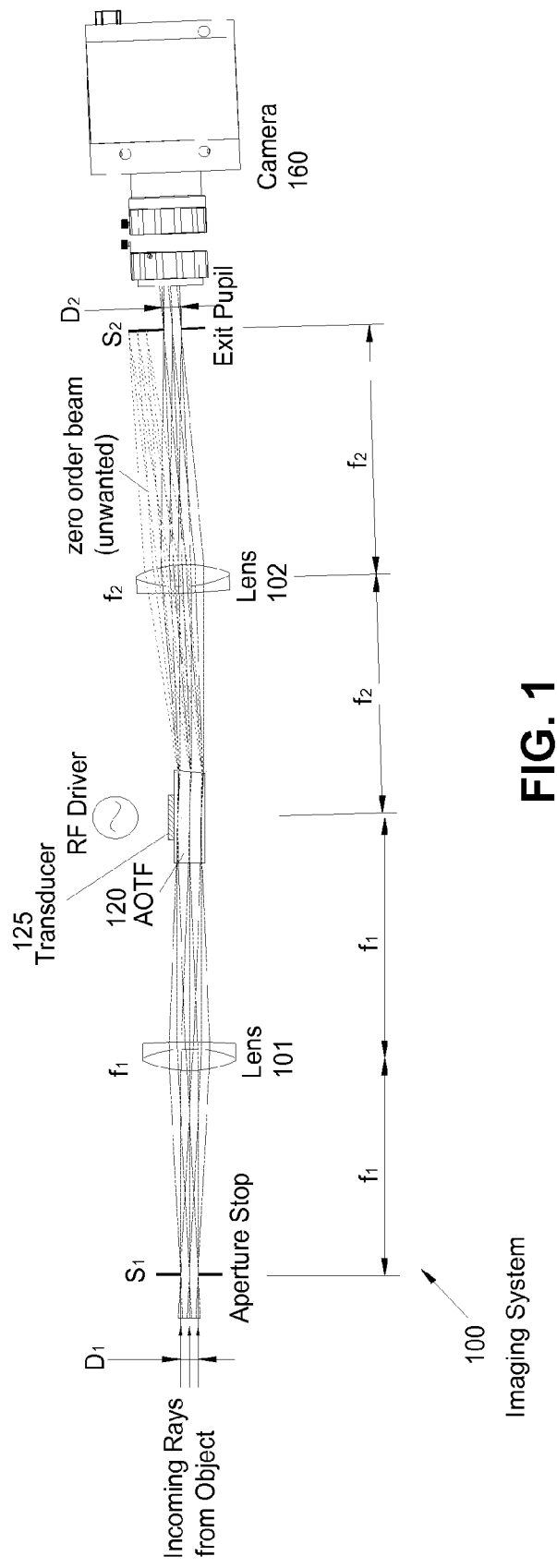
FIG. 1 shows a schematic diagram of a known telecentric-confocal AOTF-based imaging system.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Figure 2:
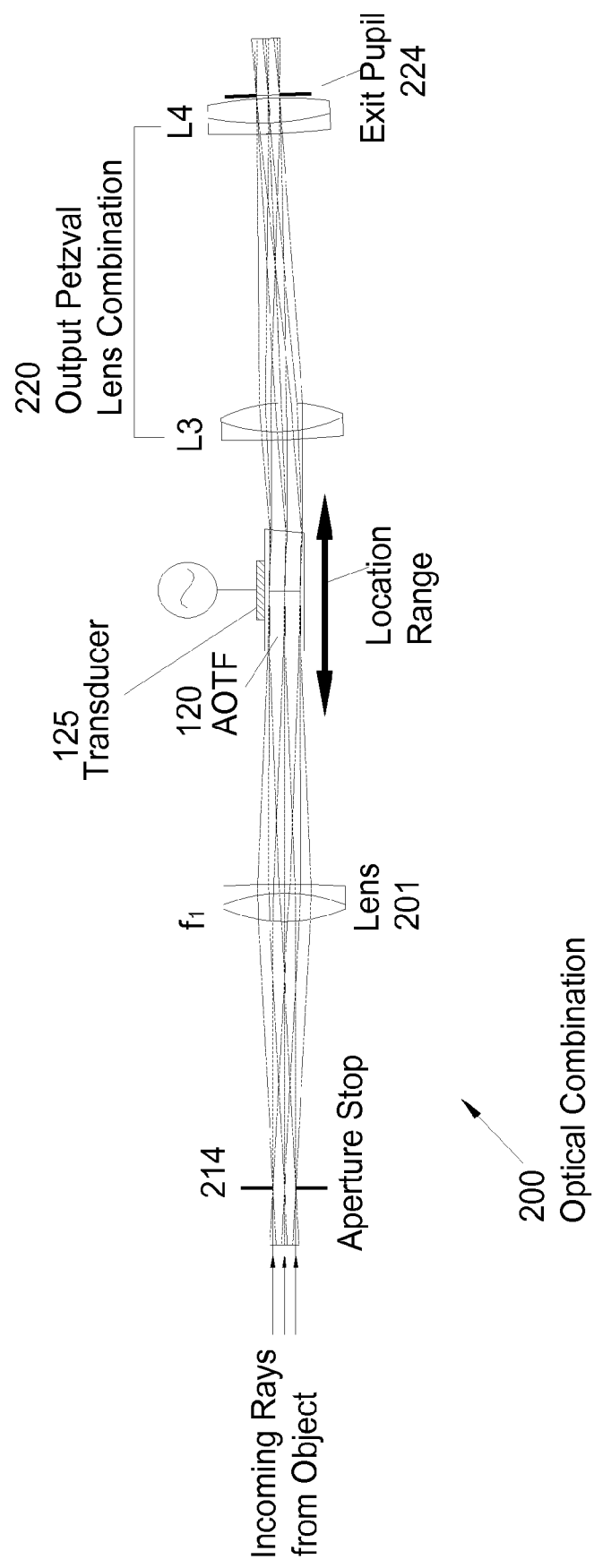
FIG. 2 shows a schematic diagram of an example optical combination including an input lens for receiving incoming rays, an output Petzval lens combination, and an AOTF positioned between the input lens and the output Petzval lens combination, according to a disclosed embodiment.

FIG. 2 shows a schematic diagram of an example optical combination 200 including an input lens 201 for receiving incoming rays, such as from objects in a scene, an output Petzval lens combination 220, and an AOTF 120 positioned between the input lens 201 and the output Petzval lens combination 220, according to a disclosed embodiment. Input lens 201 can be a conventional relay lens. The output Petzval lens combination 220 comprises spaced apart doublet lenses $L_3$ and $L_4$ both aligned along the optical axis of the optical combination 200. Optical combination 200 as well as other embodiments described below provide telecentric confocal optical arrangements.

Output Petzval lens combination 220 has a focal length $f_2$ and includes spaced apart doublet lenses $L_3$ and $L_4$ that are both aligned along the optical axis of optical combination 200. Optical combination 200 provides an intermediate image plane between lens 201 and $L_3$ between the "location range" arrows shown in FIG. 2, such as within the AOTF 120 as shown by the vertical line in FIG. 2. An input aperture stop 214 is shown on an input side of the input lens 201 and an output beam stop 224 identified as an "exit pupil" is on or near $L_4$, which is shown in FIG. 2 on $L_4$.

As used herein, the term "Petzval lens combination" refers to compound lenses comprising at least two separate groups of lenses (usually each doublets, and for simplicity only generally referred to herein as having a front doublet and a rear doublet) in which both doublets contribute positive power as one integral unit, each doublet compensating for the aberrations of the other. The Petzval lens combination is thus not a symmetrical lens arrangement unlike some specialized lens systems, so that their orientation (or sense; i.e., front or rear facing) with respect to the AOTF 120 in disclosed embodiments such as optical combination 200 matters.

The classic Petzval lens combination arrangement comprises two doublet achromats, each achromat bending the axial ray toward the optical axis by the same amount, so that the "work" is equally divided. An aperture stop is located at the front doublet. For a classic Petzval lens combination that satisfies the Petzval condition having a focal length of f, the front doublet has a focal length of 2f, the rear doublet has a focal length of f, and the (thin lens) spacing between the doublets is equal to f. The (thin lens) back focus is thus equal to f/2. Disclosed embodiments can use the classic Petzval lens combination arrangement, or modified Petzval lens combinations in which the modification can include changes to the spacing between the two doublet lenses, or the focal length of each doublet lens, or both, while maintaining the combined focal length of f, and the aperture stop location which is one f from the rear doublet lens.

Disclosed embodiments recognize advantages of the Petzval lens combination over simpler lens forms such as achromats include covering a small field at high aperture with excellent image quality. Moreover, disclosed embodiments recognize the zonal spherical and spherochromatism are small, and the secondary spectrum is less than that of an achromatic doublet of the same glass.

Petzval lens combinations also include advantages over more complex lens forms, such as double Gauss lenses. Petzval lens combinations provide higher throughput due to the reduced number of surfaces and the total thickness of media that is transmitted through, while maintaining relatively high image quality. The Inventors have also recognized Petzval lens combinations provide significant advantages that are unique to telecentric confocal AOTF imaging applications. These unique advantages include less stray light from the non-diffracted beam from the AOTF 120 since the space between $L_3$ and $L_4$ that together provide the output petzval lens combination 220 can be empty, so that the non-diffracted beam will not have the chance to hit a lens rim, or the lens barrel, and thus will not be scattered or multiple-reflected and result in stray light reaching the receiving photodetector, such as a camera.

Figure 3A:
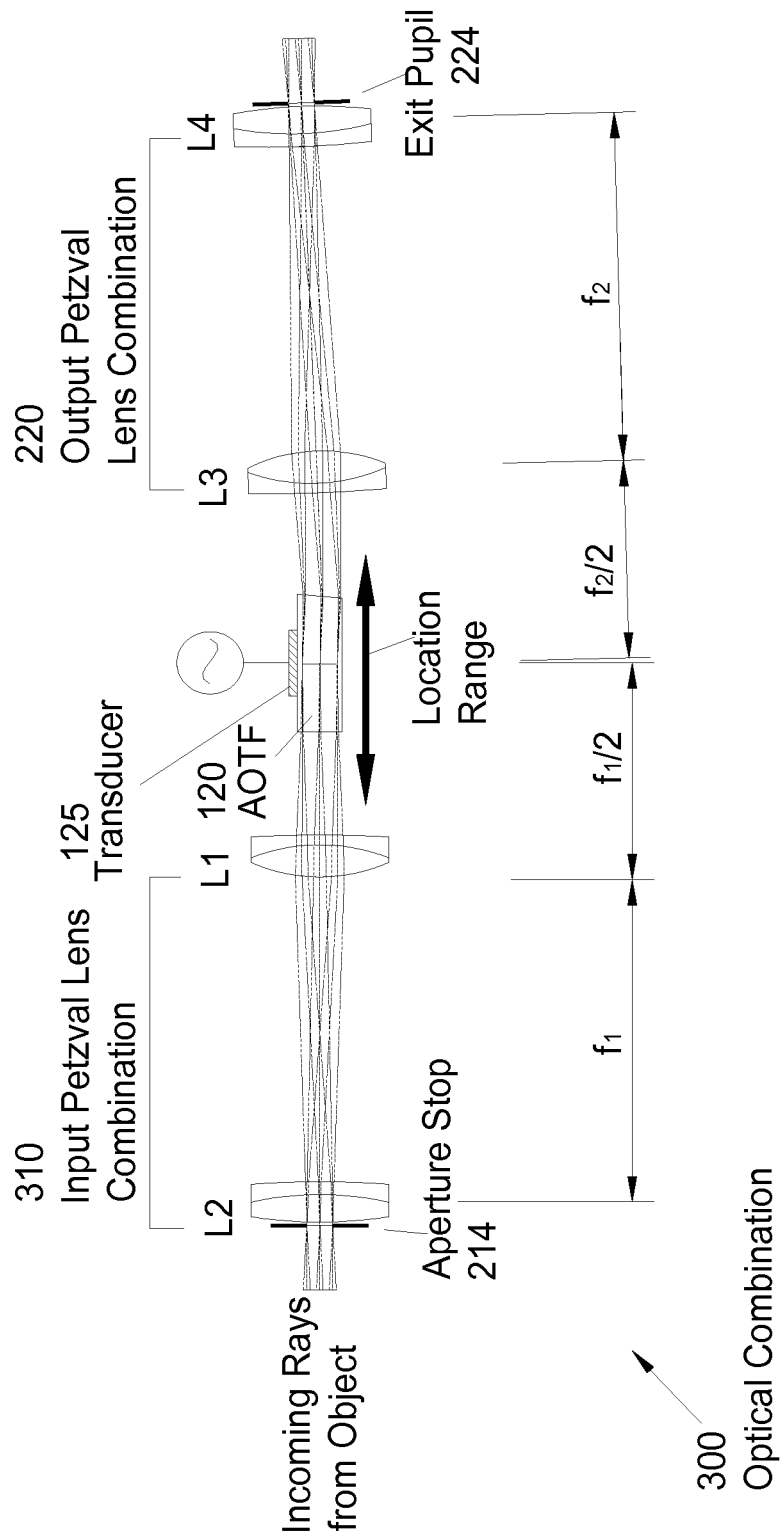
FIG. 3A shows a schematic diagram of an example imaging system including an input Petzval lens combination for receiving incoming rays, an output Petzval lens combination, and an AOTF positioned between the input Petzval lens combination and the output Petzval lens combination, according to a disclosed embodiment.

FIG. 3A shows a schematic diagram of an example optical combination 300 according to a disclosed embodiment. Optical combination 300 includes an input Petzval lens combination 310 for receiving incoming rays, an output Petzval lens combination 220, and an AOTF 120 positioned between the Petzval lens combinations 310 and 220.

Input Petzval lens combination 310 has a focal length $f_1$ and is shown receiving incoming rays from an object in a scene and includes spaced apart doublet lenses $L_2$ and $L_1$ that have a common optical axis. Output Petzval lens combination 220 has a focal length $f_2$ and includes spaced apart doublet lenses $L_3$ and $L_4$ that are both aligned along the common optical axis. An AOTF 120 is positioned between $L_1$ of the input Petzval lens combination 310 and $L_3$ of the output Petzval lens combination 220. Input Petzval lens combination 310 provides an intermediate image plane between $L_1$ and $L_3$ in the "location range" arrows shown, such as within the AOTF 120 as shown by the vertical line.

An input aperture stop 214 shown on $L_2$ is at the front focal length $f_1$ of input Petzval lens combination 310 and an output beam stop 224 identified as an "exit pupil" is at the front focal length $f_2$ of output Petzval lens combination 220 shown on L4. Beam stop 224 blocks the zero order beam and transmits first order light output by the AOTF 120. It is noted that the location of input aperture stop 214 at the front doublet $L_2$ of the input Petzval lens combination 310 in AOTF telecentric confocal hyperspectral or multi-spectral imaging applications coincides with the optimal aperture stop location of a standard Petzval lens combination which disclosed embodiments recognize improves the performance of the Petzval lens combination while meeting the requirement of AOTF-based telecentric confocal hyperspectral imaging applications.

The input Petzval lens combination 310 and output Petzval lens combination 220 are shown in FIG. 3 in a back-to-back arrangement, with their respective back doublets $L_1$ and $L_3$ face one another. In the particular embodiment where the focal lengths $f_1$ and $f_2$ of the respective Petzval lens combinations 310 and 220 are equal, the back-to-back arrangement would be in a minor image about the image plane of the AOTF 120. However, disclosed embodiments also include the case where $f_1 \neq f_2$. In the case $f_1 \neq f_2$ the Petzval lens combinations 310 and 220 are still back-to-back, but not in a mirror image arrangement.

Figure 4:
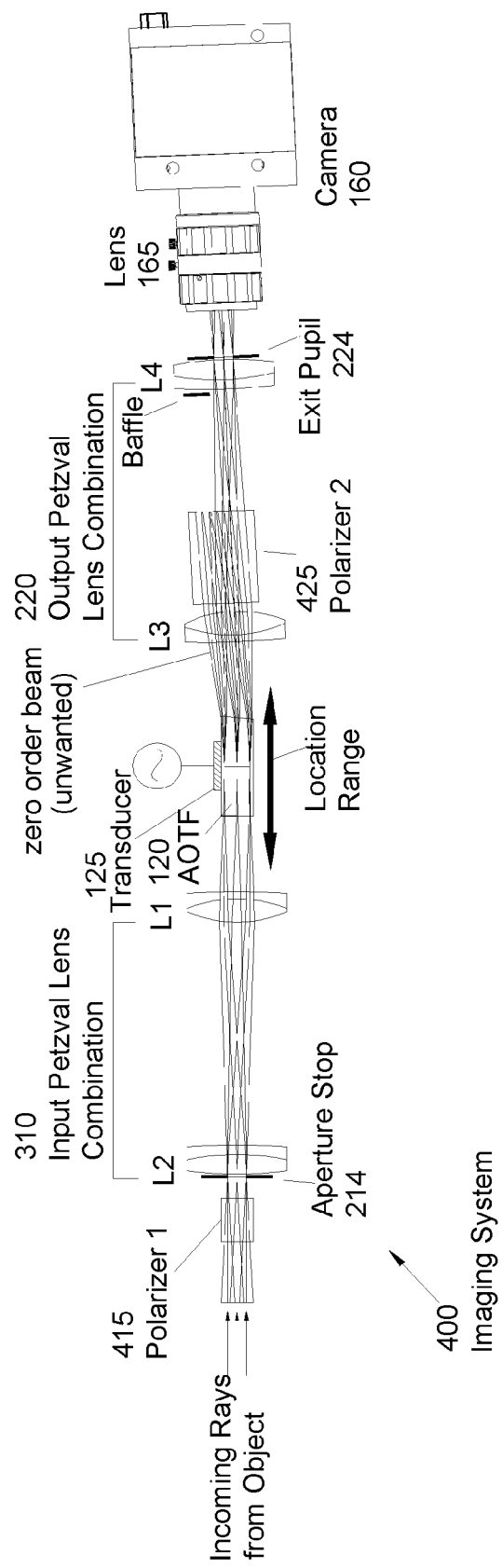
FIG. 4 shows a schematic diagram an example imaging system comprising the imaging system shown in FIG. 3B modified to include a cross-polarization polarizer pair, according to a disclosed embodiment.

A unique advantage of Petzval lens combinations in disclosed optical arrangements such as optical combination 300 is easier insertion of volume polarizers, such as Glan-Taylor prism or Rochon polarizers, prior, between, or after the Petzval lens combinations, as is commonly included for telecentric confocal imaging applications of the AOTF. As known in the art, a Rochon polarizer separates an incident beam into ordinary ray and extraordinary ray, with the extraordinary ray transmitted straight through, while the ordinary ray is transmitted with a deviation angle. A Glan-Taylor prism is a type of prism made of two right-angled prisms of calcite or other birefringent materials which are separated on their long faces with an air gap. FIG. 4 described below shows an example imaging system based on optical combination 300 that includes a cross-polarization polarizer pair.

In optical combination 300 shown in FIG. 3A the input Petzval lens combinations 310 provides a shortened input length of $f_1+f_1/2=3/2(f_1)$ because the back focal length of the input Petzval lens combination 310 is situated at $L_2$, and analogously the output Petzval lens combination optics 220 shortens the output length to $f_2+f_2/2=3/2(f_2)$. Accordingly, the overall distance between the aperture stop 214 and beam stop 224 for optical combination 300 can be seen to be $3/2 (f_1+f_2)$. This overall distance between the stops in optical combination 300 can be compared the distance between the stops of $2(f_1+f_2)$ for the known telecentric-confocal AOTF-based imaging system 100 shown in FIG. 1, where the optical combination 300 and imaging system 100 have the same etendu (light throughput). For the particular case the focal lengths of the respective Petzval lens combinations are equal ($f_1=f_2$), the distance for optical combination 300 between aperture stop 214 and beam stop 224 is 25% shorter in length as compared to the distance between aperture stop and beam stop in imaging system 100. As known in the art, this significantly reduced overall distance provided by optical combination 300 is desirable as it reduces weight, size, and cost of the system, and can also enable new highly size-constrained applications.

Figure 3B:
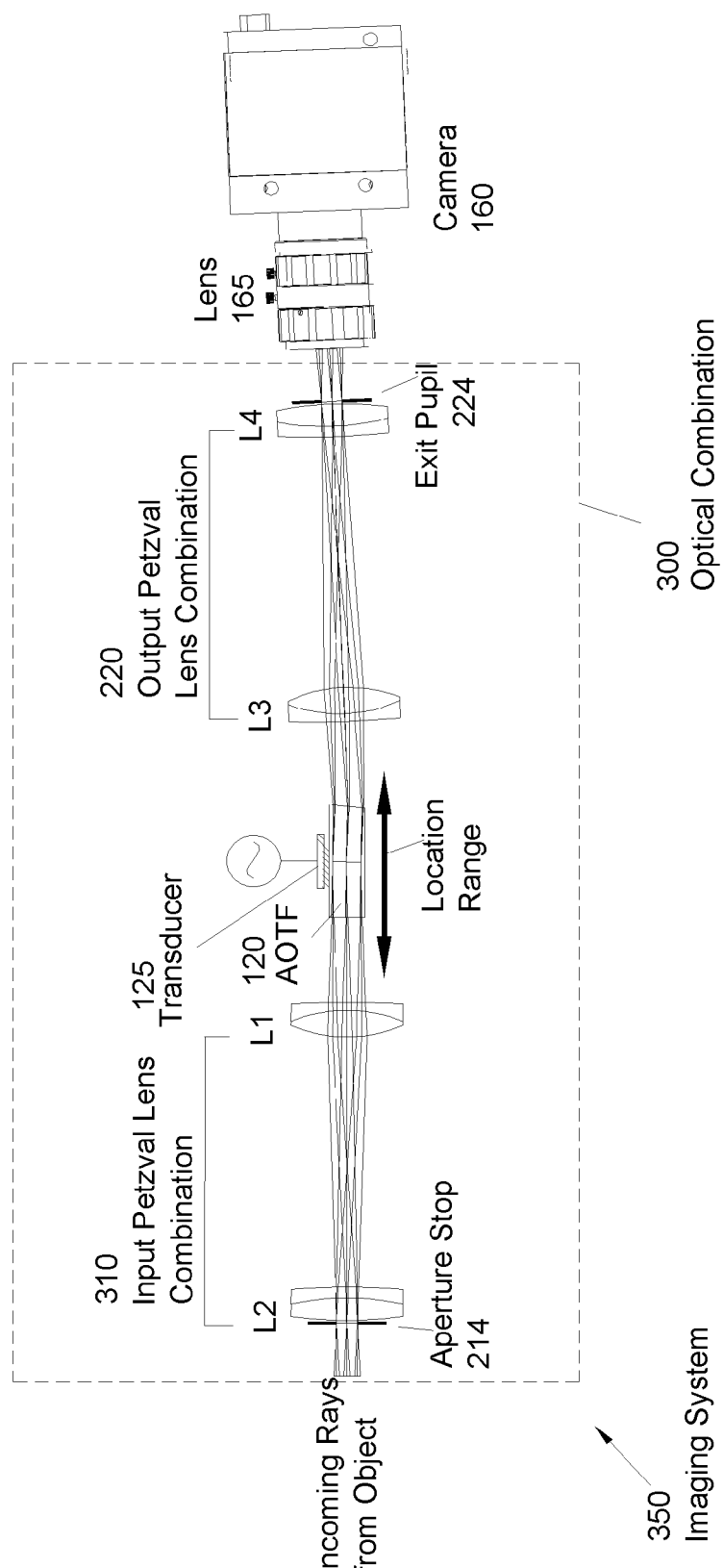
FIG. 3B shows a schematic diagram of an example imaging system comprising the optical combination shown in FIG. 3A coupled to a camera, according to a disclosed embodiment.

FIG. 3B shows a schematic diagram of an example imaging system 350 comprising the optical combination 300 shown in FIG. 3A coupled to a photodetector shown as a camera 160 having an objective lens 165, according to a disclosed embodiment. Camera 160 can be replaced, for example, by a focal plane array (FPA) or other photodetector.

FIG. 4 shows a schematic diagram of an imaging system 400 comprising the imaging system 350 shown in FIG. 3B modified to include a cross-polarization polarizer pair comprising input linear polarizer 415 shown as "polarizer 1" and output linear polarizer 425 shown as "polarizer 2", according to a disclosed embodiment. Input linear polarizer 415 and output linear polarizer 425 form a cross-polarization pair so that input linear polarizer 415 polarizes incoming light while the output linear polarizer 425 is oriented orthogonally to the input linear polarizer 415 thus blocking the rest of the light. Since the signal beam exiting the AOTF 120 is rotated 90 degrees with respect to the polarization of the input beam after the input linear polarizer 415 turns 90° of the beam's polarization, it can pass through the output linear polarizer 425 while the non-diffracted beam, which acts as stray light, is blocked.

Any type of polarizer can generally be used for disclosed cross-polarization polarizer pair embodiments assuming an adequate extinction ratio and throughput is provided. In practice, polarizers based on birefringent crystals or other birefringent materials are selected due to their higher extinction ratio and throughput compared to simple absorption polarizers.

It is assumed non-polarized light is received from the object/target. However, if an illumination source that is polarized is used to illuminate the object/target, system 400 would generally add an orientation structure, such including a rotational stage to orient the system 400 optimally to the incoming source polarization.

As noted above, disclosed Petzval lens combinations in AOTF-based hyperspectral or multi-spectral imaging systems allows shortening the overall length of the imaging system, while allowing the aperture stop and beam stop to be in the optimal or near optimal positions. The Petzval lens combination also provides a good basis for numerical optimization including the type of the glass in each of the doublet lens elements comprising the Petzval lens combination(s), the distances between the doublet lenses, and the curvatures of each lens surface, such as using a commercial (modeling/simulation) software package such as OSLO® or ZEMAX®, in order to control various aberrations which will generally be present in the system. This is because of the relatively large number of degrees of freedom in disclosed designs (i.e. distances, glass types, lens curvature, etc.).

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure. For example, disclosed optical combinations such as back-to-back Petzval lens combinations can be used with similar benefits in any telecentric confocal hyperspectral imaging applications, where the AOTF can be replaced by another dispersing element, such as a diffraction grating or dispersive prism. Other telecentric confocal imaging applications could benefit from the back-to-back Petzval lens combinations for its simplicity and compactness, and its relative high imaging quality.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. An optical combination, comprising:
   an input lens having an optical axis for receiving incoming rays;
   an output Petzval lens combination including spaced apart doublet lenses including a third doublet lens and a fourth doublet lens both aligned along said optical axis;
   an acousto-optic tunable filter (AOTF) that defines an input side and an output side for said optical combination positioned between said input lens and said third doublet lens of said output Petzval lens combination, wherein an intermediate image plane is formed between said input lens and said third doublet lens;
   an input aperture stop on said input side, and
   an output beam stop on a side of said fourth doublet lens opposite third doublet lens.

2. The optical combination of claim 1, wherein said input lens comprises an input Petzval lens combination including spaced apart doublet lenses including a second doublet lens and a first doublet lens wherein said input aperture stop is on a side of said second doublet lens opposite said first doublet lens, and wherein said input Petzval lens combination and said output Petzval lens combination are aligned back-to-back.

3. The optical combination of claim 2, wherein a focal length of said input Petzval lens combination is equal to a focal length of said output Petzval lens combination.

4. The optical combination of claim 2, further comprising a cross-polarization polarizer pair comprising input linear polarizer on said input side and output linear polarizer on said output side that is oriented orthogonally with respect to an orientation of said input linear polarizer.

5. The optical combination of claim 1, wherein said intermediate image plane is formed in said AOTF.

6. The optical combination of claim 1, wherein said output Petzval lens has a focal length of f, said third doublet lens has a focal length of f, said fourth doublet lens has a focal length of 2f, and a spacing between said third doublet lens and said fourth doublet lens is equal to f.

7. An imaging system, comprising:
   an optical combination, comprising:
      an input lens having an optical axis for receiving incoming rays;
      an output Petzval lens combination including spaced apart doublet lenses including a third doublet lens and a fourth doublet lens both aligned along said optical axis;
      an acousto-optic tunable filter (AOTF) that defines an input side and an output side for said optical combination positioned between said input lens and said third doublet lens of said output Petzval lens combination, wherein an intermediate image plane is formed between said input lens and said third doublet lens,
      an input aperture stop on said input side, and
      an output beam stop on a side of said fourth doublet lens opposite said first third doublet lens, and
   a photodetector positioned to receive a diffracted beam projected through said output beam stop and generate image data therefrom.

8. The imaging system of claim 7, wherein said input lens comprises an input Petzval lens combination including spaced apart doublet lenses including a second doublet lens and a first doublet lens, wherein said input aperture stop is on a side of said second doublet lens opposite said first doublet lens, and wherein said input Petzval lens combination and said output Petzval lens combination are aligned back-to-back.

9. The imaging system of claim 8, wherein a focal length of said input Petzval lens combination is equal to a focal length of said output Petzval lens combination.

10. The imaging system of claim 8, further comprising a cross-polarization polarizer pair comprising input linear polarizer on said input side and output linear polarizer on said output side that is oriented orthogonally with respect to an orientation of said input linear polarizer.

11. The imaging system of claim 7, wherein said intermediate image plane is formed in said AOTF.

12. The imaging system of claim 7, wherein said output Petzval lens has a focal length of f, said third doublet lens has a focal length of f, said fourth doublet lens has a focal length of 2f, and a spacing between said third doublet lens and said fourth doublet lens is equal to f.

13. An optical combination, comprising:
   an input Petzval lens combination including spaced apart doublet lenses including a second doublet lens and a first doublet lens having an optical axis for receiving incoming rays;
   an output Petzval lens combination including spaced apart doublet lenses including a third doublet lens and a fourth doublet lens both aligned along said optical axis;
   an acousto-optic tunable filter (AOTF) that defines an input side and an output side for said optical combination positioned between said first doublet lens and said third doublet lens wherein an intermediate image plane is formed between said first doublet lens and said third doublet lens;

an input aperture stop on a side of said second doublet lens opposite said first doublet lens, and an output beam stop on a side of said fourth doublet lens opposite said third doublet lens, wherein said input Petzval lens combination and said output Petzval lens combination are aligned back-to-back.

14. The optical combination of claim 13, wherein a focal length of said input Petzval lens combination is equal to a focal length of said output Petzval lens combination, and wherein said intermediate image plane is formed in said AOTF.

* * * * *